R. C. POWELL & O. R. FAITH.
TRACTION SIGNAL FOR AUTOMOBILES.
APPLICATION FILED DEC. 1, 1915.

1,285,371.

Patented Nov. 19, 1918.
2 SHEETS—SHEET 1.

Inventor
Russell C. Powell.
O. R. Faith.

Witnesses
Frederick L. Fox.
J. W. Garner

By Victor J. Evans.
Attorney

R. C. POWELL & O. R. FAITH.
TRACTION SIGNAL FOR AUTOMOBILES.
APPLICATION FILED DEC. 1, 1915.

1,285,371.

Patented Nov. 19, 1918.
2 SHEETS—SHEET 2.

Inventor
Russell C. Powell.
O. R. Faith.

Witnesses
Frederick L. Fox.

By Victor J. Evans.

Attorney

UNITED STATES PATENT OFFICE.

RUSSELL C. POWELL AND OLIVE R. FAITH, OF NEW KENSINGTON, PENNSYLVANIA.

TRACTION-SIGNAL FOR AUTOMOBILES.

1,285,371.   Specification of Letters Patent.   Patented Nov. 19, 1918.

Application filed December 1, 1915. Serial No. 64,488.

*To all whom it may concern:*

Be it known that we, RUSSELL C. POWELL and OLIVE R. FAITH, citizens of the United States, residing at New Kensington, in the county of Westmoreland and State of Pennsylvania, have invented new and useful Improvements in Traction-Signals for Automobiles, of which the following is a specification.

This invention relates to traction signals for use on automobiles, street cars, and other motor vehicles to indicate the direction that will be taken by the vehicle to the right or left to prevent collisions and other accidents, the object of the invention being to provide improved signaling devices of this kind which are electrically operated, and which may be readily controlled by the chauffeur.

The invention consists in the construction, combination and arrangement of devices, hereinafter described and claimed.

In the accompanying drawings:—

Figure 1:
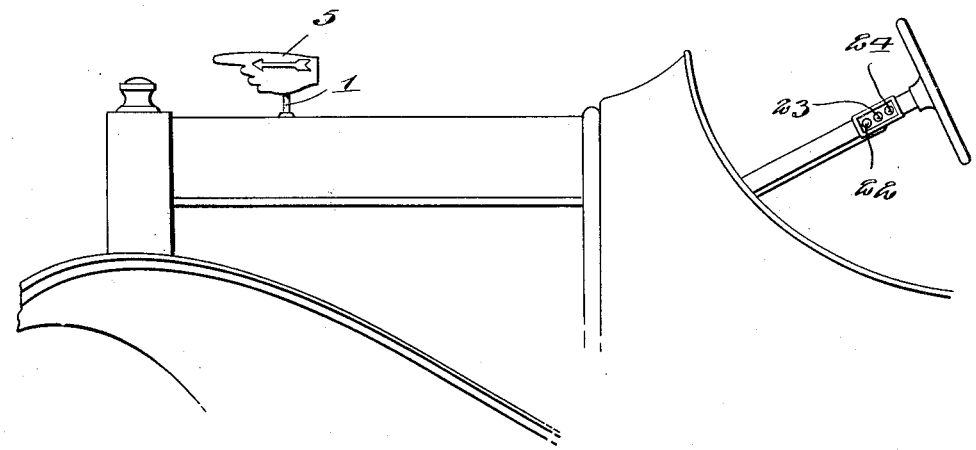
Figure 1 is an elevation of a traction signal, constructed and arranged in accordance with our invention and showing the same installed in an automobile, the front portion of which is diagrammatically indicated.
Figure 2:
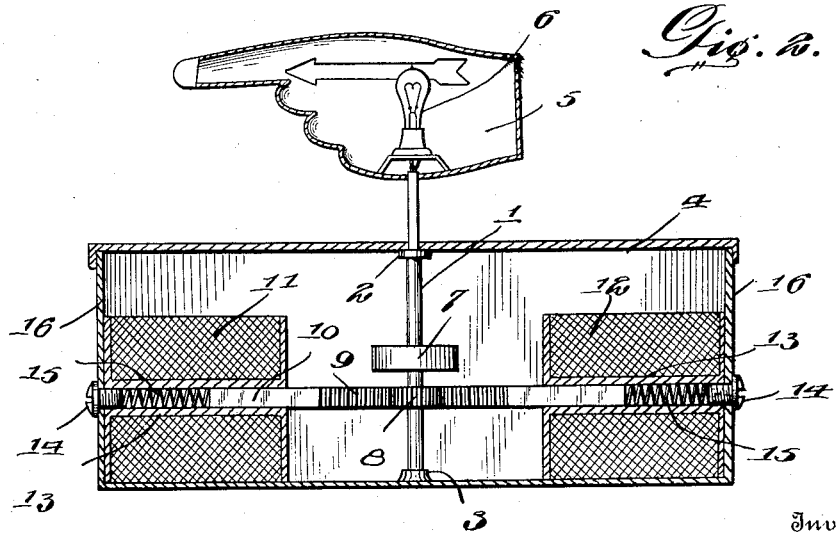
Fig. 2 is a longitudinal sectional view of the direction signal.
Figure 3:
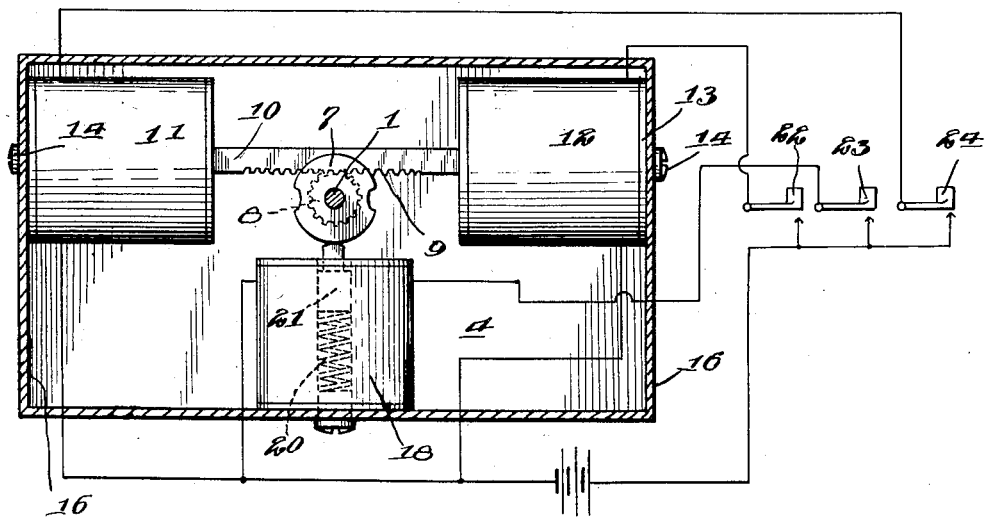
Fig. 3 is a plan of the same, partly in section and with the electric circuits represented in diagram.
Figure 4:
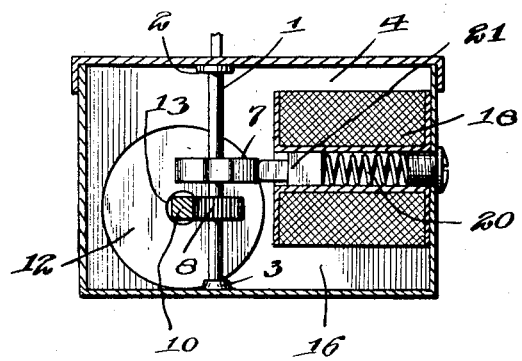
Fig. 4 is a vertical transverse sectional view of the same.

In the embodiment of our invention, we provide a vertical signal shaft 1 which is here shown as having an upper bearing 2 and a lower bearing 3 in a frame or casing 4 which may be arranged under the hood of an automobile, the upper end of the shaft extending above the hood. A pointer 5 which is here shown as in the form of a hand is secured to the upper end of the shaft 1 to be turned therewith. This pointer is hollow and contains an electric lamp 6. As here shown the pointer is provided with an arrow-shaped opening in each side to conspicuously indicate the direction after night. The pointer may however be otherwise constructed if preferred.

A friction wheel 7 is secured on the shaft 1 at a suitable point and is provided at opposite sides with peripheral notches as shown. Said shaft is also provided with a pinion 8 which is fast thereto and which engages a rack 9 which is on one side of the common core rod 10 of a pair of solenoids 11, 12. The spools 13 of the solenoids form guides of the core rod 10 and are provided in their outer ends with screws 14 which may be adjusted. Counteracting springs 15 are arranged in the bores of the spools and bear between the screws 14 and the ends of the core rod and operate to normally hold the core rod in such position as to cause the rack and the pinion to hold the shaft 1 with the pointer pointing straight ahead. The screws 14 also secure the spools of the solenoid coils to the ends 16 of the frame or casing 4. When one of the solenoids is energized, the corresponding movement of the core rod will cause the rack and pinion to turn the shaft 1 with the signal device or indicating hand in one direction or the other to indicate the direction in which the vehicle will move. When both of the solenoids are deenergized, the springs 15 will return the signal shaft to normal position with the pointer pointing straight ahead and will hold the shaft and pointer in such position.

A horizontally arranged solenoid 18 is also provided in its bore with a spring 20 which serves to normally force the core 21 outwardly and frictionally engage the core against the edge of the wheel 7 to lock and hold the shaft 1 and prevent said shaft from casually turning. The spool of the solenoid 18 is secured to the frame or casing 4 at a point opposite the shaft 1.

The solenoid coils 11, 12, 18, are respectively included in the electric circuit with circuit closers 22, 23, and 24 which are arranged preferably on the steering post and convenient to the chauffeur. When the machine is to be turned to the right, the circuit closer 22 must be depressed. When the machine is to be turned to the left the circuit closer 24 must be depressed. To cause the signal to return to normal straight ahead position, the circuit closer 23 must be depressed as will be understood.

When the core rod 10 is at the end of its movement in either direction, to indicate that the machine is to be turned to the right or left the core 21 will be held by the spring 20 engaged in one of the peripheral notches of the friction wheel 7, to maintain the core rod 10 in such position when both the solenoids 11, 12 are deënergized. Hence the circuit closers 22, 24 need only be momentarily depressed and can then be released. When the circuit closer 23 is depressed to cause the solenoid 18 to be energized and the core 21 retracted against the tension of the spring 20 the springs 15 as hereinbefore stated return the core rod 10 to normal, neutral position. When the circuit closer 23 is then reopened the spring 20 engages the core 21 with the periphery of the friction wheel 7 to hold the same and the shaft 1 against casual turning in either direction, so that the spring 20 and core 21 coact with the springs 15 in holding the signaling mechanism in normal position.

Having described the invention, what is claimed is:

In a signal of the class described, a signal shaft mounted for rotation in either direction, a friction wheel on the shaft having notches at opposite sides, solenoids at opposite sides of the shaft, a common core rod for the solenoids geared to the shaft, counteracting springs at the ends of said core rod to normally hold the latter in neutral position, a third solenoid, a core piece for said third solenoid arranged for engagement with the periphery and with either of the notches of said friction wheel, a spring to project said core piece, and electric circuits one for the windings of each of the solenoids, each of said circuits including a circuit closing device.

In testimony whereof we affix our signatures in presence of two witnesses.

RUSSELL C. POWELL.
OLIVE R. FAITH.

Witnesses:
S. B. ABBOTT,
JOHN B. HAGERMAN.